J. WILLMANN.
LIQUID COOLING APPARATUS.
APPLICATION FILED JUNE 3, 1910. RENEWED NOV. 25, 1911.
1,015,660.
Patented Jan. 23, 1912.
2 SHEETS—SHEET 2.
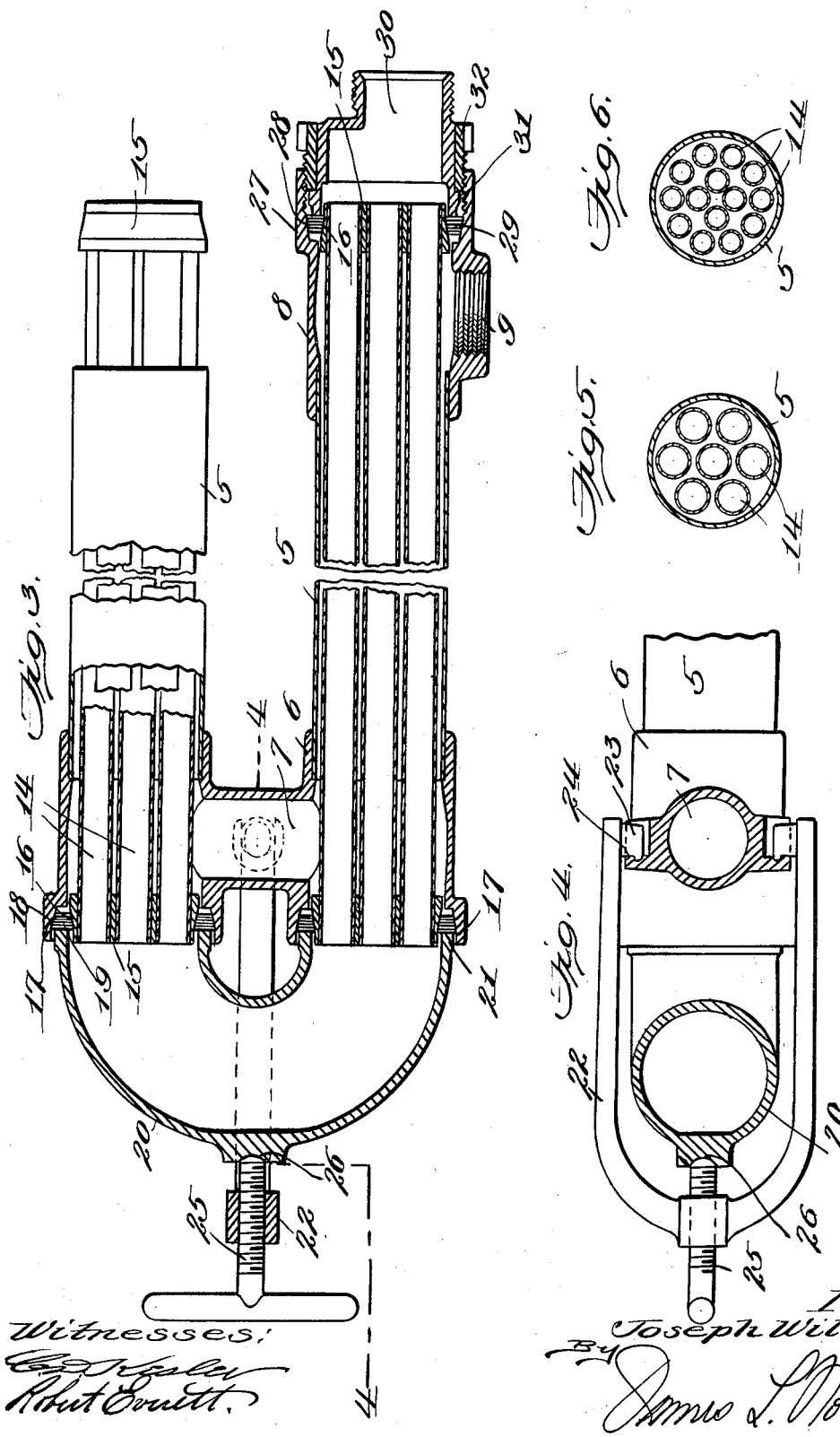

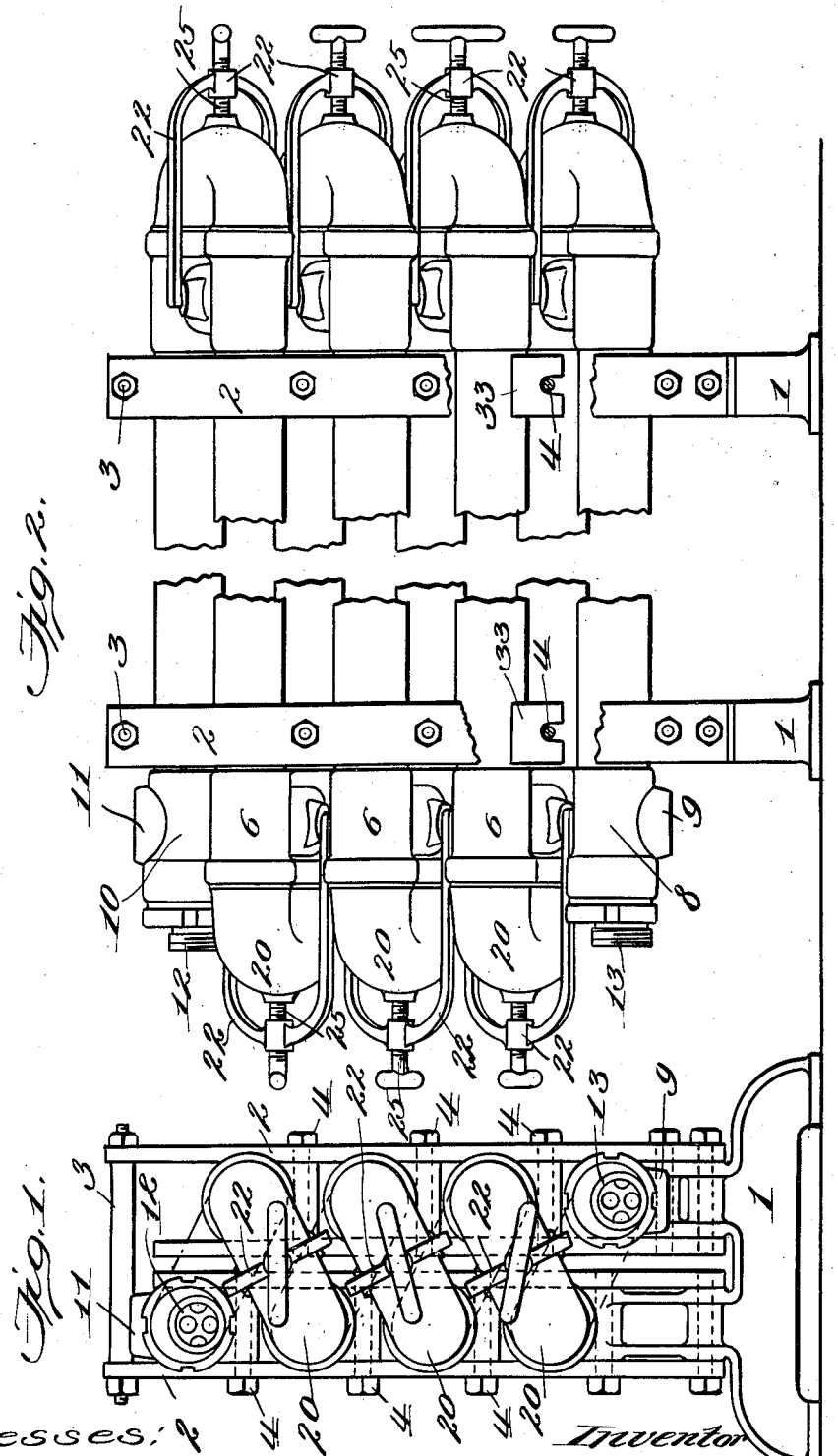

UNITED STATES PATENT OFFICE.

JOSEPH WILLMANN, OF DERBY, CONNECTICUT, ASSIGNOR TO DAIRY MACHINERY AND CONSTRUCTION COMPANY, INCORPORATED, OF DERBY, CONNECTICUT, A CORPORATION OF CONNECTICUT.

LIQUID-COOLING APPARATUS.

1,015,660.     Specification of Letters Patent.     Patented Jan. 23, 1912.

Application filed June 3, 1910, Serial No. 564,800. Renewed November 25, 1911. Serial No. 662,469.

*To all whom it may concern:*

Be it known that I, JOSEPH WILLMANN, at present a subject of the Emperor of Germany, having announced my intention of becoming a citizen of the United States, residing at Derby, in the county of New Haven and State of Connecticut, have invented certain new and useful Improvements in Liquid-Cooling Apparatus, of which the following is a specification.

My present invention relates to improvements in apparatus for interchanging temperatures between liquids such, for example, as between a heated liquid and a cooling liquid or medium, and it has for its object primarily to provide an improved apparatus of this character which is especially adapted for use in the handling of milk and similar liquids during or upon the completion of a pasteurizing operation, the improved apparatus causing the milk or liquid under treatment to be divided into a plurality of streams or flowing bodies, each of relatively small size or diameter whereby such liquid is effectively exposed to the heating or cooling action of the heat-interchanging medium, the capacity of an apparatus of given size being thereby materially increased, and greater efficiency and perfection in the operation is insured.

More specifically, the invention provides an improved cooling apparatus for liquids, the apparatus being of the type wherein the liquid to be cooled is inclosed and it is divided into such small bodies that the brine or cooling mixture will reach and quickly cool every portion of the liquid, the construction of the apparatus being such that the parts through which the liquid under treatment passes may be readily removed for cleaning or sterilization and, when replaced, simple and improved devices are provided for insuring a perfect separation of the liquid under treatment from the brine or cooling mixture.

To these and other ends, the invention consists in certain improvements, and combinations and arrangements of parts, all as will be hereinafter more fully described, the novel features being pointed out particularly in the claims at the end of the specification.

In the accompanying drawing:—Figure 1 represents an end elevation of a cooling apparatus constructed in accordance with my present invention; Fig. 2 represents a side elevation of the apparatus as shown in Fig. 1, a portion of the figure being broken away to show the manner in which the elements are supported; Fig. 3 is a detail sectional view of one of the elements of the apparatus showing the manner in which the fluid-conducting tubes are mounted within the incasing tubes; Fig. 4 represents a section on the line 4—4 of Fig. 3; and Figs. 5 and 6 represent transverse sections of one of the elements showing the passages for the liquid to be treated.

Similar parts are designated by the same reference characters in the several views.

In the accompanying drawing, I have shown the preferred embodiment of my invention and in the specific description thereof, I shall refer to it as an apparatus for cooling milk and other liquids. It will be understood, however, that the apparatus could be employed for pasteurizing milk by the circulation of water or steam at an appropriate temperature through the apparatus instead of a brine or other cooling medium. It will be understood also that the invention is not necessarily limited to the specific details of construction shown, as certain modifications may be made in order that the apparatus may be applied to the best advantage according to the requirements or circumstances of each particular case.

In the present instance, the apparatus is provided with a base 1 which may be of any suitable construction, and the fluid-conducting elements of the apparatus are mounted in superposed relation thereon. For this purpose, the base 1 supports frames 2, each frame being connected at the top by tie-bolts 3, and a suitable number of bolts or studs 4 project inwardly from the sides of the respective frames. In order to economize space and to also insure efficiency in the operation of the apparatus, the liquid-conducting elements are mounted in zig-zag relation, the studs 4 being therefore staggered.

The liquid-conducting elements of the apparatus are preferably formed of a suitable number of units or elements, each element consisting of an outer tube 5 which is adapted to contain and confine the brine or cooling medium, and the opposite ends of each tube 5 are fitted into sockets 6, each socket having a conducting passage 7 which leads from one tube to the next adjacent one. The passages 7 alternate, that is to say, one of these passages leads from one end of an element to the adjacent end of a second element, and the next passage 7 leads from the opposite end of the second element to the adjacent end of the third element, this relation of the intercommunicating passages continuing throughout its series. The lowermost element is provided with a socket 8 having an inlet 9 to receive the brine or cooling medium while the uppermost element has a socket 10 provided with an outlet 11 for the brine or cooling medium. In employing the apparatus as a cooler, it is preferably operated upon the regenerative principle, that is to say, the hot liquid to be cooled flows in an opposite direction to the flow of the brine or cooling medium. The upper socket 10 is therefore provided with an inlet 12 to receive the hot milk or liquid to be cooled, while the lower socket 8 has an outlet 13 for the discharge of the cooled milk or liquid.

According to the present invention, the liquid to be treated is divided into numerous streams or bodies, each of a relatively small size or diameter, whereby heat may be quickly interchanged between the liquid in the form of the small streams or bodies and the liquid contained in the outer inclosing tubes. In the present instance, each inclosing tube 5 contains a plurality of comparatively small tubes 14. In order to render these tubes readily removable for cleaning or sterilization and to provide a perfectly tight joint between them and the inclosing tubes so as to prevent mixing of the liquids, the opposite ends of the small tubes 14 are tightly fitted into heads 15, these heads, however, being of a size that will permit them and the tops to be readily removed and replaced as a unit with respect to the inclosing tube or casing. To insure a perfectly tight fit between these heads and the inclosing tubes or casings, each head 15 is provided with an outwardly tapered surface 16. Each casing 6 is provided with a flange 17 having an offset tapered surface 18, and a gasket 19 of relatively soft rubber or other suitable material is firmly packed into the space formed between the taper surfaces 16 and 18. I preferably provide means which performs the dual function of packing the gasket 19 firmly in position and forming communication between the inner set of small tubes 14 of one member and the corresponding tubes of the adjacent member. This means consists in the present instance of an elbow 20, the ends 21 of which are adapted to fit within the flanges 17 of the socket 6 and act as glands to compress the gaskets 19, and the elbow may be held in such position by any suitable means, a yoke 22 being provided in the present instance, the ends of which are provided with projections 23 to coöperate with seats 24 formed on the opposite sides of the socket 6, and a clamping screw 25 is fitted in the yoke and its end is adapted to bear upon a seat 26 formed in an intermediate portion of the elbow.

A somewhat similar construction may be provided for forming a tight joint at the inlet and outlet for the liquid to be treated, the socket 8 for instance having a flange 27 provided with a taper surface 28 which is opposed to the taper surface 16 of the adjacent head 15, a gasket 29 is inserted between the opposed taper surfaces, the nipple 30 which serves for the attachment of the inlet or discharge pipe is constructed to bear upon the gasket and has a circumferential shoulder 31, and a nut 32 is threaded into the flange 27 and bears upon the shoulder 31 of the nipple. The several elements of the apparatus may be conveniently supported within the frames 2 by means of seats 33 which may be cast or otherwise formed to rest upon the inwardly projecting studs 4.

Assuming that the apparatus is to be employed as a cooler, brine or other cooling medium will be admitted through the inlet 9 and discharged through the outlet 11 while the milk or other liquid to be cooled is introduced at the inlet 12 and discharged at 13. The liquid under treatment will flow in an opposite direction to the flow of the cooling medium, thereby affording the latter ample opportunity in which to absorb the heat from the hot liquid. The cooling medium will flow, for example, toward the right in the lowermost element and upon reaching the end of this element will pass through the passage 7 and then flow in a reverse direction through the second lowest element in the series, the cooling medium continuing to flow upwardly and in a zigzag course until it is discharged through the outlet 11. The milk or liquid to be cooled on the other hand will enter at 12, flowing toward the right within the relatively small inner tubes 14 and upon reaching the right hand end of the uppermost element will pass through the elbow 20 and then enter and flow toward the left in the second element of the series, and the milk will continue to flow in a zigzag course until it is discharged through the outlet 13, the apparatus being preferably so proportioned that the discharging milk will have substantially the same temperature as the brine or cooling medium entering the apparatus.

The construction of the apparatus is such that the inner tubes 14 and their headers may be removed with the greatest facility after each operation of the apparatus for the purpose of cleaning or sterilization and, when replaced, a perfectly tight joint may be quickly formed so that there is no opportunity of a mixing of the liquids. Owing to the relatively small bodies of the liquid contained in the inner tubes 14, it is obvious that the liquid will quickly give up its heat to the cooling medium.

I claim as my invention:

1. In an apparatus of the class described, the combination of a plurality of tubular elements forming fluid passages, a set of relatively small tubes adapted to be contained in each element, a head having a fluid-tight fit upon said tubes at one end and having a tapered periphery removably fitting within the corresponding tubular element, a gasket interposed between the tapered periphery of said head and the adjacent wall of the surrounding tubular element, and a member having means for forcing it into engagement with said gasket to compress the latter and thereby form a fluid-tight joint between the head, the tubular element and said member.

2. In an apparatus of the class described, the combination of a plurality of tubular elements forming fluid passages, a set of relatively small tubes contained in each element, a head having a fluid-tight fit upon said tubes at each end, said head having a tapered periphery removably fitting within said element, a tapered gasket interposed between the tapered periphery of each head and the adjacent wall of the respective tubular element, a detachable elbow forming a fluid-tight connection between the tubes within adjacent elements and having flanges engaging said gaskets, and means for exerting a pressure upon each elbow to produce compression upon the respective gaskets and thereby form and maintain fluid-tight joints between the respective heads and the surrounding tubular elements.

In testimony whereof I have hereunto set my hand in presence of two subscribing witnesses.

JOSEPH WILLMANN.

Witnesses:
CLARENCE A. BATEMAN,
CHAS. S. HYER.